Dec. 12, 1933. H. B. FABER ET AL Re. 19,022
AERIAL TOY
Original Filed Dec. 10, 1928
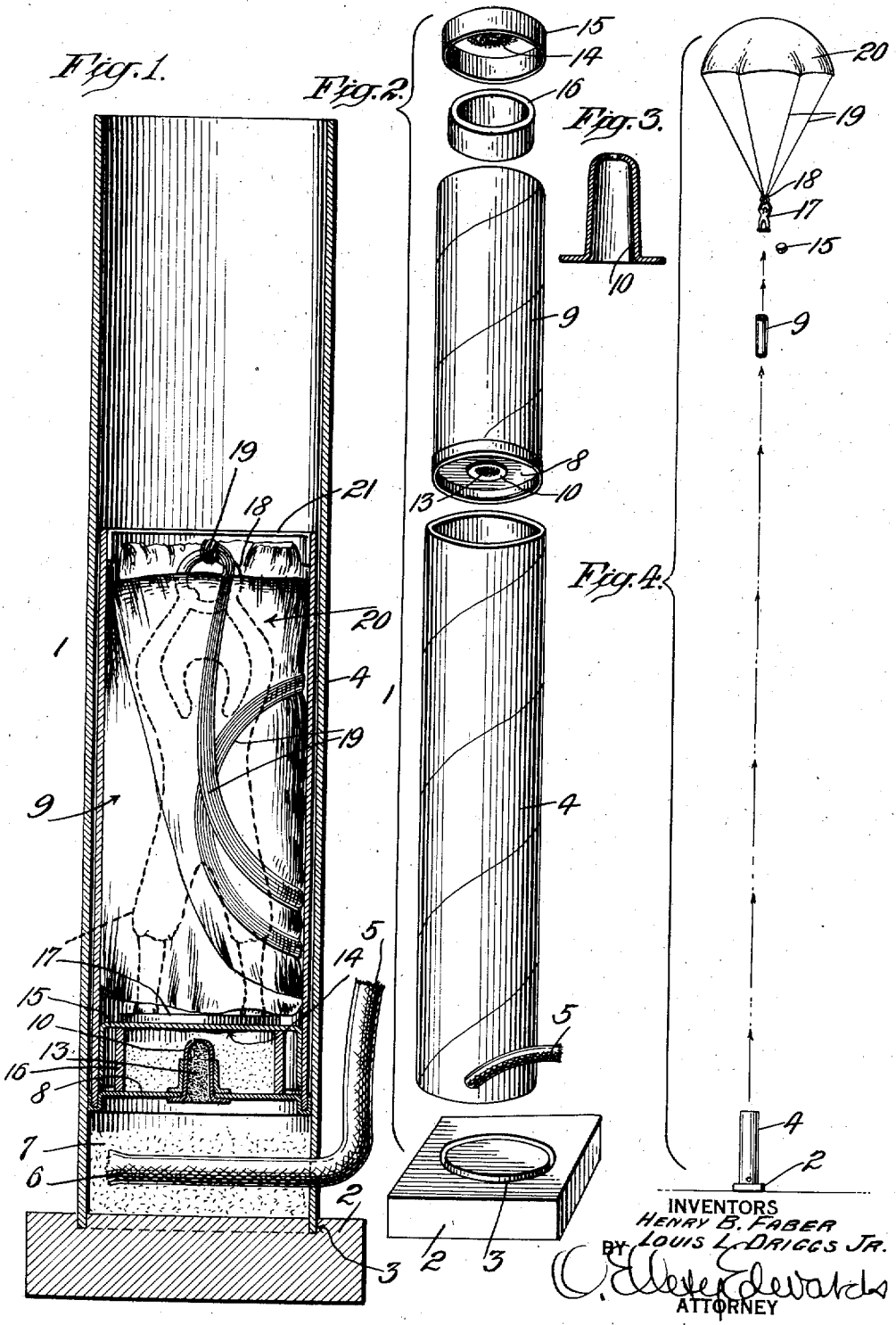
INVENTORS
HENRY B. FABER
LOUIS L. DRIGGS JR.
BY C. Clifford Edwards
ATTORNEY Reissued Dec. 12, 1933

Re. 19,022

UNITED STATES PATENT OFFICE 19,022

AERIAL TOY

Henry B. Faber, New York, N. Y., and Louis L. Driggs, Jr., Tippecanoe City, Ohio Original No. 1,785,770, December 23, 1930, Serial No. 325,018, December 10, 1928. Application for reissue November 30, 1932. Serial No. 645,064

13 Claims. (Cl. 42—55)

The object of this invention is to provide a device wherein a paper parachute may be blown into the air with a weight suspended therefrom and thereafter be allowed to drift with the wind and fall to the earth slowly under the influence of gravity. This and other objects are accomplished by our invention, one embodiment of which is hereafter more particularly set forth.

For a more detailed description of our invention, reference is to be had to the accompanying drawing, forming a part hereof, in which Figure 1 is a longitudinal section of our improved toy.

Figure 2 shows parts of the same arranged in their relative positions.

Figure 3 shows a portion of the time fuse.

Figure 4 shows the operation of the device.

Throughout the various views of the drawing, similar reference characters designate similar parts.

Our improved toy 1 is provided with a base 2 with a circular groove 3 in which is fixed, by glue or otherwise, a cylinder 4 which is preferably made of multiple-ply spirally wound paper strips, thus forming a paper tubing. Near the lower end of this cylinder 4 and just above the base 2 is a hole through which passes a fuse 5 which runs to some grains of powder that are at the bottom of the explosive chamber 7, and in the upper portion of this chamber is free air which is proportioned to the powder in such a way as to give a suitable propelling action to the projectile, which will be described below, and at the same time not disrupt the tube.

Immediately above the chamber 7 is a disc 8 with a U flange at its edge resting snug against the interior of the tube 4 and with the U pointed upward to receive the cylindrical shell 9 of the projectile which will now be described. At the center of the disc 8 is a time fuse 10 which passes through a central perforation in the disc 8 and is made in the form of an eyelet with an inner shell which is dome shaped at its top and provided with a central perforation and on the exterior of this is the outer shell 12 and both these shells have laterally extending flanges which appear above and below the disc 8 so as to fix the fuse in place. The interior of the fuse is provided with powder 13 which takes about a second to burn out. It is compressed between the dome and the bottom of the shell 11 and through the perforation in the dome so that when finally burned out a flame passes through this perforation to the priming 14 on the lower surface of a disc or check 15 with a downwardly extending flange which is snug against the interior of the shell 9. Between the disc 15 and the disc 8 is placed an annular collar 16 so that when the projectile is fired from the tube 4, the thrust on the disc 8 is transmitted to the disc 15. The disc 15 is preferably made of paper and fits with a gas tight joint against the interior of the tube 9.

On the disc 15 and immediately above the annulus 16 is placed the base of a figure 17 at the upper end of which is a loop 18 to which are secured a series of strings 19 which run to the parachute 20 folded in the tube 9 and these strings 19 are so arranged about the parachute 20 as not to interfere with the opening of the same when projected in a manner which will be described below. On top of the parachute 20 and strings 19 is a sealing disc 21, substantially identical with the disc 15, with a downwardly extending flange fitting the interior of the tube 9 so that any thrust exerted by the action of an explosive 22 on the disc 8 and in the annulus 16 will be transmitted through the figure 17 to the disc 19 and force the same from the tube immediately before the parachute string and figure are forced out and these in turn precede the expulsion of the disc 15 and the annulus 16 so that under no circumstances can the thrust from either explosive charge 6 or 22 be transmitted to the parachute 20 so as to injure the same.

In view of the foregoing, the operation of our improved toy will be readily understood. Assuming the parts to be in the position indicated in Figure 1, the fuse 5 is lit thereby igniting the powder 6 which burns slowly but sufficiently quickly to expel the projectile with its bottom disc 8 and cylindrical wall 9 and included parts, and at the same time the time fuse 10 is ignited at the bottom. At the required time, say when the projectile is one hundred and fifty feet in the air, the time fuse functions to light the priming 14 on the bottom of the disc 15 and this ignites the powder 22 which causes a second explosion and thereby drives the disc 15 and the superincumbent load thereon from the casing 9. The direct thrust on the base of the figure 17 throws it into the air and free of its parachute which thereupon immediately opens and resists further upward movement and causes the figure to assume a vertical position below the parachute, as indicated in Figure 4. The parachute then begins to fall in the conventional manner and is blown in the usual way by any wind that may exist, until it lands on the earth. Thereafter the parachute may be recovered and thrown into the air until worn out, lost or destroyed, so that through the use of this toy, a child may have the pleasure incidental to the usual discharge and projection of the parachute, an effort to recover the same and finally, if recovered, of throwing it in the air.

While we have shown and described one embodiment of our invention, it is obvious that it is not restricted thereto, but that it is broad enough to cover all structures that come within the scope of the annexed claims.

Having thus described our invention, what we claim is:

1. In a device of the class described, a base, a tube secured to the base, an explosive chamber in said tube, a fuse running to said explosive chamber, an explosive in said chamber, a projectile closing the upper end of said chamber, said projectile having a time fuse, an expelling charge chamber, an explosive in said last mentioned chamber, means for transmitting a thrust from the bottom to the top of the expelling charge chamber, a rigid means mounted on the top of said second explosive chamber, a parachute wrapped about said means and means for securing the parachute to the means, whereby the thrusts due to the various explosions will in no way injure the parachute nor interfere with its operation when functioning.

2. In a device of the class described, a base, a cylindrical tube rising from said base, an explosive chamber at the bottom of said tube and on said base, a fuse running to the explosive chamber, an explosive in the chamber, a projectile closing the upper end of the chamber, said projectile having a cylindrical wall secured to its base, a time fuse in said base and passing above the same, an expelling charge chamber above the disc, an expelling charge in the expelling charge chamber, a check at the top of the expelling charge chamber and means for carrying a parachute above the check.

3. In a device of the class described, a projectile having a base with a time fuse mounted therein, an annular collar on said base, an expelling charge above the base and within the annular chamber, a check mounted on said annular base and means for transmitting a thrust from the check when the expelling charge is functioning.

4. In a device of the class described, a time fuse composed of two concentric eyelets and a slow burning charge, the inner of said eyelets having a perforated dome.

5. In a device of the class described, a time fuse composed of two concentric eyelets with laterally projecting flanges adapted to engage the opposite sides of a disc, a perforated dome at the upper end of one of said eyelets and a slow burning charge in said eyelets.

6. In a device of the class described, a projectile having a flat metal base with a U flange, a cylindrical paper tube secured in said flange, a time fuse mounted in the center of said base, an annular collar resting on said base and surrounding said time fuse, a check fitting snug in said tube and surrounding the annular collar, an expelling charge mounted on said base and adapted to be ignited by the time fuse, a figure resting on the check, cords secured to said figure, a parachute wrapped around said figure and secured to said cords and a cap for closing the end of the projectile remote from the base.

7. In a device of the class described, a time fuse composed of two concentric eyelets with projecting flanges, and a slow burning charge, the eyelets being secured together and adapted to hold a disc between their projecting flanges.

8. In a device of the class described, a projectile having a base with a time fuse mounted therein, an annular collar on said base, an expelling charge above the base and within the annular chamber, a check mounted on said annular base, a rigid thrust transmitting means mounted on said check, a parachute around said thrust transmitting means and means for closing the top of the projectile, adapted to come in direct contact with the rigid means for transmitting the thrust and free of the parachute.

9. In a device of the class described, a base, a tube secured to the base, an explosive chamber in said tube, a fuse running to said explosive chamber through the side wall of the tube at the bottom thereof, an explosive in said chamber loosely arranged in said chamber, a projectile closing the upper end of said chamber and retaining the explosive in said tube, said projectile having a time fuse and expelling charge chamber, an explosive in said last mentioned chamber, a check mounted within said projectile over said explosive, means for transmitting a thrust from the bottom to the top of the chamber comprising a rigid means mounted on top of the check on the second explosive chamber, a parachute wrapped about said means, and means for securing the parachute to the means whereby the thrust due to the various explosions will in no way injure the parachute nor interfere with its operation when functioning.

10. In a device of the class described, a base, a cylindrical tube rising from said base, an explosive chamber at the bottom of the tube and on said base, a fuse running to the explosive chamber from a point below a projectile closing the explosive chamber, an explosive in said chamber, a projectile closing the upper end of the chamber and retaining the explosive within the tube, said projectile having a cylindrical wall secured to its base, a time fuse in said base and communicating with a second charge of explosive, a second charge of explosive comprising an expelling charge, a check on top of the expelling charge, and means for carrying a parachute above the check to protect it from being compressed when the projectile is shot out of the tube and the parachute and its carrying means are forced out of the projectile.

11. In a device of the class described, a mortar, a loose charge of power in the base of said mortar, a fuse running from the side walls of the tube to said charge of powder, a projectile completely enclosing and retaining said loose powder in the tube but entirely independent of the charge of powder, said projectile comprising a base and tube, a time fuse extending through said base to the interior of the tube, an expelling charge in said tube, a check over said charge, a thrust member mounted on said check, a parachute wrapped around said thrust member and attached thereto whereby a single tube is used with a single shell.

12. In a device of the class described, a projectile having a base with a time fuse mounted therein, an expelling charge above the base within the projectile, a check mounted on said expelling charge engaging with the side walls of the projectile, and means for transmitting a thrust from the check when the expelling charge is functioning.

13. In a device of the class described, a projectile having a base with a time fuse mounted therein and passing therethrough, an annular body on said base comprising the projectile side wall, an expelling charge above the base and within said annular side wall, a check mounted on said annular side wall and over said expelling charge, a rigid thrust transmitting means mounted on said check, a parachute around said thrust transmitting means, and means for closing the top of the projectile adapted to be brought in direct contact with the rigid thrust means for transmitting the thrust and ejecting the means for closing the top of the projectile so that the parachute will be freed from the projectile without compression and means attaching the thrust transmitting means to the parachute to draw it down to earth.

HENRY B. FABER.
LOUIS L. DRIGGS, JR.